(12) United States Patent
Wright et al.

(10) Patent No.: US 6,272,340 B1
(45) Date of Patent: Aug. 7, 2001

(54) LOAD SHEDDING METHOD TO ENHANCE UPLINK MARGIN WITH COMBINED FDMA/TDMA UPLINKS

(75) Inventors: David A. Wright, Solana Beach; Donald C. Wilcoxson, Redondo Beach, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/275,594

(22) Filed: Mar. 24, 1999

(51) Int. Cl.[7] .................................................. H04Q 7/20
(52) U.S. Cl. ........................ 455/427; 455/12.1; 455/67.1
(58) Field of Search ........................... 455/427, 10, 12.1, 455/13.4, 13.1, 69, 13.3, 522, 504, 505, 506, 453, 451, 450, 452, 509, 464; 370/252, 318

(56) References Cited

U.S. PATENT DOCUMENTS 5,956,619 * 9/1999 Gallagher et al. .................. 455/69

* cited by examiner

Primary Examiner—Marsha D. Banks-Harold
(74) Attorney, Agent, or Firm—Robert W. Keller

(57) ABSTRACT

A load shedding method and apparatus to enhance uplink margin between a terrestrial terminal (14) and a satellite (12) in a satellite based communications system (10) is provided. The terrestrial terminal (14) includes a multi-carrier network (40) that generates a plurality of uplink carrier channels. A RF transmit and receive system (48) transmits the plurality of uplink carrier channels to the satellite (12). A terminal control unit (46) determines an attenuation level on the plurality of uplink carrier channels transmitted to the satellite (12). The terminal control unit (46) also instructs the multi-carrier network (40) to increase or decrease the number of uplink carrier channels to be transmitted to the satellite.

4 Claims, 6 Drawing Sheets

LOAD SHEDDING METHOD TO ENHANCE UPLINK MARGIN WITH COMBINED FDMA/TDMA UPLINKS

BACKGROUND OF THE INVENTION

1. Field of the Invention

This invention relates generally to a communications system and, more particularly, to a load shedding method to enhance uplink margin with combined FDMA/TDMA uplinks in a satellite based cellular communications system.

2. Discussion of the Related Art

In satellite based cellular communications systems, a central terrestrial control processor or network operations center (NOC) generally controls one or more communications satellites operating within the communications system. Each communications satellite within the communications system services multiple users located in multiple geographic areas, known as ground cells. The communications satellites receive and transmit data signals to and from the multiple users or terrestrial terminals positioned at the different locations within the separate ground cells on a point-to-point manner. In a frequency division multiple access (FDMA)/time division multiple access (TDMA) communications system, signals on the same frequency, polarization and time slot are generally reused by different users within the spatially separated ground cells because of bandwidth constraints.

An antenna on each communications satellite generates a multitude of spot beams to illuminate a surface on the earth where the ground cells are located in order to accommodate the re-use of the frequencies throughout the communications system. Antenna patterns for each spot beam covering each ground cell typically roll off very fast towards the edge of the beam, and thus with even small antenna or satellite pointing errors, the user on the ground may see significant signal attenuation due to this mispointing. Moreover, since modern satellite communications systems now operate at much higher carrier frequencies (for example, Ka-band), these signals are vulnerable to large attenuations due to rain, scintillation, and other atmospheric effects. Because of this, the terrestrial user terminals will have degraded performance unless attenuation mitigation is employed.

Conventional ways of mitigating attenuation caused by atmospheric effects, roll-off, etc., include transmitting at a lower data rate or at a higher power level to enhance or increase the transmitted energy per bit. Alternatively, additional error control coding may be used where the coding rate is increased without increasing the occupied bandwidth. This, however, reduces the amount of information bits being transmitted since more error control bits are generated with the higher error control rate. Increasing the coding also causes the demodulator on-board the satellite to be more complex. Increased power also means that the transmitter amplifier is oversized in nonfade conditions, thereby increasing overall system cost without any tangible benefits.

What is needed then is a load shedding method and apparatus to enhance uplink margin which does not suffer from the above-mentioned disadvantages. This will, in turn, provide a satellite based cellular communications system which utilizes multiple FDMA carrier channels simultaneously to operate in a multi-carrier fashion; enable "shedding" of carrier channels as fading or attenuation levels increase, thereby increasing the transmitted energy per bit to overcome the increased attenuation; provide a means for monitoring and controlling the appropriate number of carrier channels to be used by the terrestrial terminal; eliminate the requirement of multiple rate demodulators on-board the satellite to reduce satellite complexity; and provide terrestrial terminals that can support different numbers of carrier channels to provide varying fade capability such that the terrestrial terminals are scaleable in size and cost. It is, therefore, an object of the present invention to provide a satellite based cellular communications system which utilizes a load shedding method to enhance uplink margin with combined FDMA/TDMA uplinks.

SUMMARY OF THE INVENTION

In accordance with the teachings of the present invention, a load shedding method to enhance uplink margin between a terrestrial terminal and a satellite in a satellite based cellular communications system is provided. The load shedding method provides a means to efficiently and cost effectively provide enhanced uplink margin by utilizing multiple uplink carrier channels simultaneously. The power level of the carrier channels or number of carrier channels may then be adjusted depending on the particular attenuation levels.

In one preferred embodiment, a load shedding method to enhance uplink margin between a terrestrial terminal and a satellite in a satellite based communications system includes generating a first signal having a first carrier channel and a second signal having a second carrier channel. The first signal having the first carrier channel and the second signal having the second carrier channel are transmitted from the terrestrial terminal to the satellite. A transmit power level of the first signal and the second signal transmitted from the terrestrial transmitter is determined and a received power level of the first signal and the second signal received at the satellite is determined. Transmission of the second signal having the second carrier channel is terminated when the transmit power level of the first signal and the second signal transmitted from the terrestrial terminal exceeds a first threshold.

In another preferred embodiment, a load shedding method to enhance uplink margin between a terrestrial terminal and a satellite in a satellite based communication system includes generating a plurality of uplink carrier channels. The plurality of uplink carrier channels are transmitted from the terrestrial terminal to the satellite. A transmit power level and a receive power level of the plurality of uplink carrier channels are determined. An attenuation level on the plurality of uplink carrier channels based upon the transmit power level and the receive power level is also determined. The transmit power level of the plurality of uplink carrier channels is adjusted based upon the attenuation level.

In yet another preferred embodiment, a terrestrial terminal for enhancing uplink margin between the terrestrial terminal and a satellite in a satellite based communication system includes a multi-carrier network operable to generate a plurality of uplink carrier channels. An RF transmit and receive system transmits the plurality of uplink carrier channels to the satellite. A terminal control unit determines an attenuation level on the plurality of uplink carrier channels transmitted to the satellite and instructs the multi-carrier network to increase or decrease the number of uplink carrier channels to be transmitted.

Use of the present invention provides a load shedding method to enhance uplink margin in a combined FDMA/TDMA uplink used in a satellite based cellular communications system. As a result, the aforementioned disadvantages associated with the current communications systems have been substantially reduced or eliminated.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENT(S)

The following description of the preferred embodiment concerning a load shedding method to enhance uplink margin with combined FDMA/TDMA uplinks on a satellite based cellular communications system is merely exemplary in nature and is not intended to limit the invention or its application or uses. Moreover, while the invention is described in detail below with respect to specific numbers of carriers and power levels, as well as signal formats, it will be appreciated by those skilled in the art that the present invention may be employed with various numbers of carriers, different power levels, as well as different signal formats.

Figure 1:
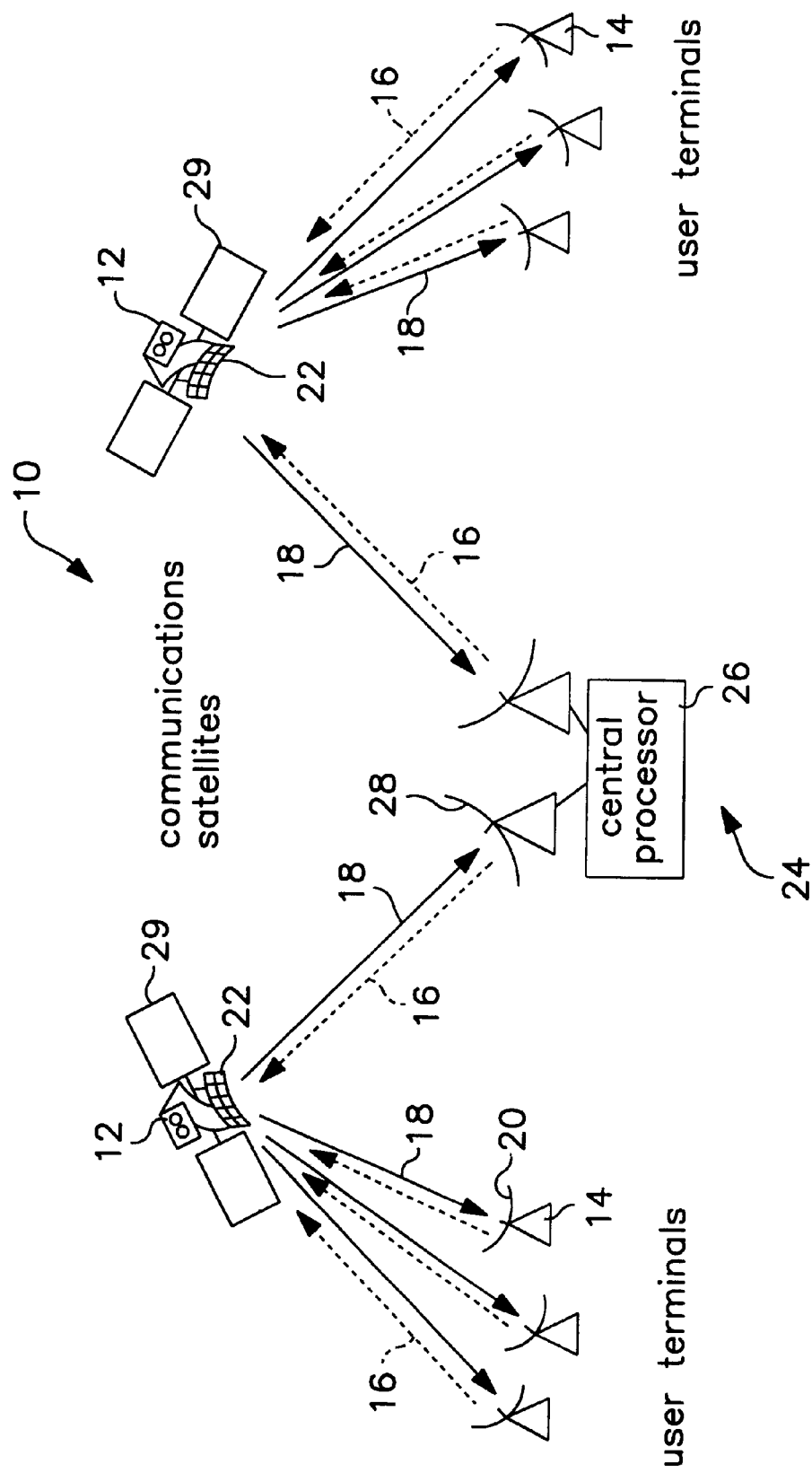
FIG. 1 is an overall satellite based cellular communications system block diagram.

Referring to FIG. 1, a satellite based cellular communications system 10 for supporting multiple users located in multiple geographic areas or ground cells is shown. The communications system 10 includes one or more processing communications satellites 12 operating generally in geosynchronous orbits. Each communications satellite 12 supports multiple terrestrial user terminals 14 positioned within various defined ground cells, further discussed herein. Each communications satellite 12 receives data signals from the user terminals 14 on communications uplinks 16 and transmits data signals to the user terminals 14 on communications downlinks 18. Each user terminal 14 transmits data signals on the communications uplinks 16 which may include multiple carrier channels and receives data signals on the communications downlinks 18, via an antenna 20. Each communications satellite 12 receives and transmits the data signals on the communications uplinks 16 and the communications downlinks 18, via a multi-beam antenna 22 or any other appropriate antenna to service the required region.

The satellite based cellular communications system 10 also includes a network operations center (NOC) 24 which includes a central control processor 26. The network operations center 24 generally controls the overall operations of each communications satellite 12 utilizing communications uplinks 16 and communications downlinks 18, via an antenna 28. These overall operations include maintenance of the geosynchronous orbit, positioning of solar collectors 29, initializing satellite system parameters, user billing, as well as other operational controls which are all well known in the art. The central control processor 26 in the network operations center 24 is preferably a general purpose programmable computer of appropriate computational power.

Figure 2:
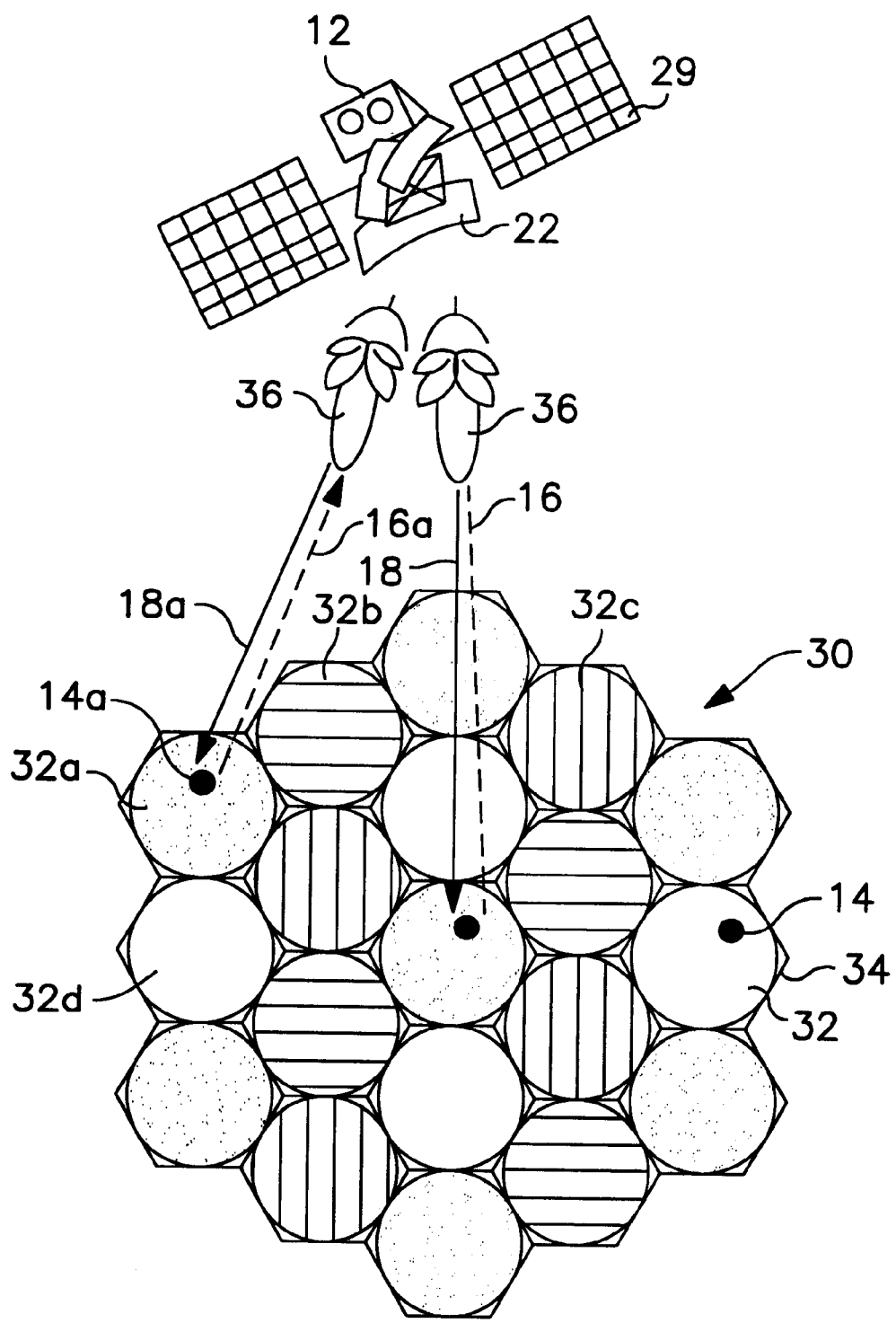
FIG. 2 is a detailed block diagram of communication uplinks and downlinks between terrestrial user terminals located within multiple ground cells and a processing communications satellite.

Referring now to FIG. 2, a processing communications satellite 12 is shown illuminating a coverage region 30, via antenna 22. The communications satellite 12 services the coverage region 30 which includes multiple ground cells 32 represented by each circular region. Each of the ground cells 32 is shown positioned within a hexagonal shaped region 34 which are the regions each individually illuminated by one antenna beam from the multi-beam antenna 22 on the communications satellite 12. Each ground cell 32 typically measures approximately 300 to 400 miles in diameter and is generally measured as the shortest distance between two points where the antenna gain is minimally acceptable. For example, this may be a point at which the antenna gain drops off by 5 or 6 dB.

The coverage region 30 is shown utilizing what is known as a 4-to-1 reuse where the coverage region 30 is separated into one of four types of ground cells 32a–32d. Of course, any other type of reuse pattern may also be employed. Each of the ground cells 32 having the same shading operate within the same frequency band. Within each particular frequency band, many different carrier frequencies or channels (carrier channels) are available to user terminals 14 operating within these ground cells 32. For example, each of the ground cells 32a may be allocated a first 100 MHz frequency band that is divided into 200 carrier channels. In this way, user terminal 14a within the ground cell 32a is allocated at least one of the 200 carrier channels and at least one of the time slots allocated to that particular carrier channel. Similarly, each of the ground cells 32b may be allocated a second 100 MHz frequency band, each of the ground cells 32c may be allocated a third 100 MHz frequency band and each of the ground cells 32d may be allocated a fourth 100 MHz frequency band. In other words, all of the ground cells identified as 32a will be operated within the same 100 MHz frequency band having the same 200 carrier channel available and so forth throughout each set of ground cells 32 within the coverage region 30.

User terminal 14a in ground cell 32a is operating within the first 100 MHz frequency band and say, for example, carrier channel one within this 100 MHz frequency band. The communications uplink 16a originating from user terminal 14a is directed into a main beam 36 of the multibeam antenna 22 servicing ground cell 32a. User terminal 14a is also bursting on and off within a particular time slot for carrier channel one within the 100 MHz frequency band. User terminal 14a may also use additional carrier channels within the 100 MHz frequency band and/or additional time slots depending on how much bandwidth the user terminal 14a requires to transmit all its data, via communications uplink 16a. Should the user terminal 14a use additional carrier channels, the load shedding method to enhance uplink margin according to the teachings of the present invention may be employed, further discussed herein. Each of the communications downlinks 18 from the communications satellite 12 to the multiple user terminals 14 within each group of ground cells 32a–32d operate on a single carrier frequency or channel and is generally always on. In other words, all of the ground cells 32a operate on a first carrier frequency, all of the ground cells 32b operate on a second carrier frequency and so forth. The reason for the single carrier frequency being used for each group of ground cells 32a–32d on the communications downlinks 18 is because of the limited power constraints associated with operating the processing communications satellite 12.

Figure 3:
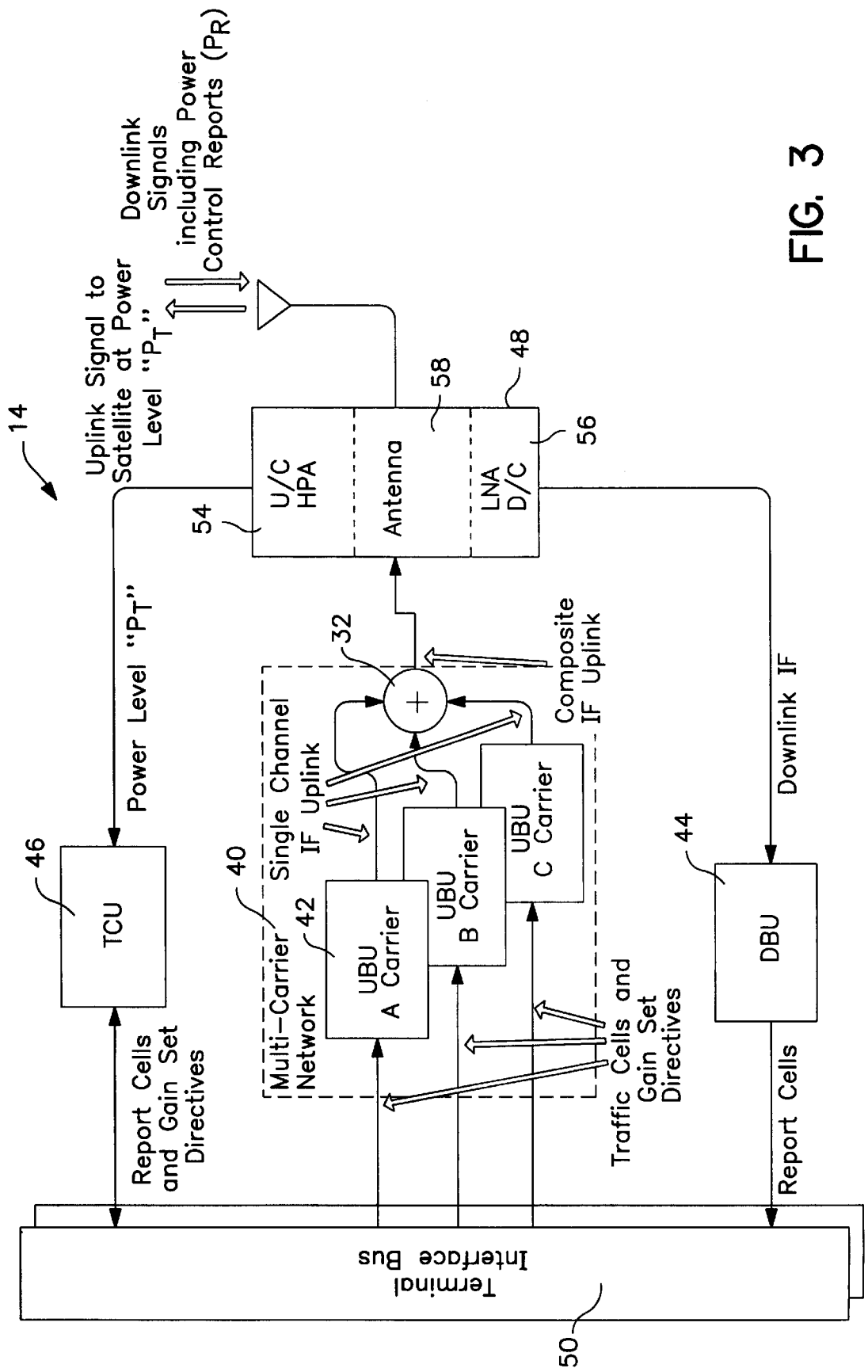
FIG. 3 is detailed block diagram of a terrestrial terminal which employs the load shedding method of the preferred embodiment of the present invention.

Turning now to FIG. 3, a detailed block diagram of a terrestrial user terminal 14 is shown. The user terminal 14 includes a multicarrier network 40 having multiple uplink baseband units (UBU) 42, a downlink baseband unit (DBU) 44, a terminal control unit (TCU) 46, and an RF transmit and receive unit 48, each of which communicate, via a terminal interface bus 50. The multi-carrier network 40 include the plurality of uplink baseband units 42 corresponding to the number of carrier channels the particular user terminal 14 will be operating on. For example, three uplink baseband units 42 are shown, each operating at a different carrier frequency (i.e., carriers A, B and C). Each uplink baseband unit 42 receives digital data bits or ATM (asynchronous transfer mode) packets, referred to as traffic cells, that include both information data and control commands to adjust IF gain (gain set directives). The control commands originate from the terminal control unit 46 and are received from the terminal interface bus 50. The information data originates from a user processor (not shown) in communication with the terminal interface bus 50 and may be any type of digital data, including communications data, video data, voice data, etc., which is required to be transferred from one location to another.

Each uplink baseband unit 42 is conventional in construction and includes a formatter, an error control coder (encoder), a modulator, and an up-convertor. The signal formatter formats the signals to the particular format required. For example, in a TDMA system, multiple ATM packets may be combined in a particular time block and appended with a header. The error control coder encodes the digital data bits. The modulator and the up-converter modulate the encoded digital data bits and up-converts them to an IF (intermediate frequency) uplink signal. Once formatting, encoding, modulation and up-converting have taken place, each uplink baseband unit 42 outputs an IF uplink signal at its particular carrier channel (i.e., A, B or C). The power or gain for each IF uplink signal is also adjusted in the uplink baseband unit 42, via commands or instructions (gain set directions) from the terminal control unit 46, further discussed herein. Each IF uplink signal from each uplink baseband unit 42a, 42b and 42c are applied to a power combiner 52 which sums each IF uplink signal and generates a composite IF uplink signal having three carrier channels. Once summed, the composite IF uplink signal is delivered from the multi-carrier network 40 to the RF transmit/receive unit 48.

The RF transmit/receive unit 48 is a conventional RF transmit/receive system. In this regard, the RF transmit/receive unit 48 includes an up-converter portion 54, a down-converter portion 56 and an antenna 58. The up-converter portion 54 includes an up-converter (U/C) which receives the composite IF uplink signal and up converts the IF uplink signal to a RF uplink signal. The up-converter then applies this composite RF uplink signal to a high power amplifier (HPA), such as a travelling wave tube amplifier (TWTA), which is a non-linear amplifier. The high power amplifier amplifies the RF uplink signal which is subsequently transmitted to the communications processing satellite 12, via the antenna 58. The antenna 58 may be any conventional antenna such as a parabolic dish.

The RF uplink signal is transmitted to the processing communication satellite 12 at a transmit power lever $P_T$. The RF uplink signal is received at the processing communications satellite 12 at a received power level $P_R$. The processing communication satellite 12 receives the RF uplink signal and transmits RF downlink signals, via the antenna 22, which are received by the antenna 58. The RF downlink signals include communications data, video data, voice data or other information data, as well as power control reports that identify the received power level $P_R$. The RF downlink signals are applied to the down-converter portion 56 and are first applied to a low noise amplifier (LNA) to amplify the RF downlink signals. The amplified RF downlink signals are then down converted in a down-converter (D/C) from an RF frequency to an IF frequency. This IF downlink signal is then applied to the downlink baseband unit 44.

The downlink baseband unit 44 converts the IF downlink signal to a digital data stream which includes the particular digital information being transferred, as well as the power control reports, identified as report cells. The downlink baseband unit 44 may be any conventional downlink baseband unit. The downlink baseband unit 44 includes a down-converter, a demodulator, a decoder and a deformatter. The demodulator demodulates the signal. The down-converter down converts the IF signal. The error control decoder decodes the coded data and the deformatter deformats the data into ATM packets. The data cells and the report cells from the downlink baseband unit 44 are applied to the terminal interface bus 50.

The transmit power level $P_T$ of the RF uplink signal is forwarded to the terminal control unit 46, which may be any type of microprocessing unit depending on the computational power required. The terminal control unit 46 reads the transmit power level $P_T$ supplied by the up-converter portion 54 of the RF transmit/receive unit 48. The terminal control unit 46 also receives and reads the report cells from the downlink baseband unit 44, via the terminal interface bus 50, which identifies the received power level $P_R$. By comparing and taking the difference between the transmit power level $P_T$ and the received power level $P_R$ from the report cells, the terminal control unit 46 can determine the attenuation or fading level (i.e., $P_T$–$P_R$) on the RF uplink signal having the composite carrier channels.

This attenuation may be caused by any number of reasons including atmosphere conditions, weather conditions, misalignment of ground cells, etc. Since the high power amplifier in the up-converter portion 54 amplifies the RF uplink signal at a constant level, the way the transmit power level $P_T$ is controlled for each particular carrier channel (carriers A, B and C) is by adjusting the IF power level for each IF uplink carrier channel in the uplink baseband unit 42. In this regard, should it be required to adjust the power level of the IF uplink signals at the uplink baseband units 42 or if any of the carrier channels should be dropped or added, the terminal control unit 46 instructs the uplink baseband units 42, via gain set directives, which are forwarded to each uplink baseband unit 42 on the terminal interface bus 50. The uplink baseband units 42 will then adjust the IF power level based on these instructions which will cause the transmit power level $P_T$ to change accordingly. Alternatively, the uplink baseband units 42 may terminate transmission of its particular carrier channel should it be instructed by the terminal control unit 46.

Figure 4:
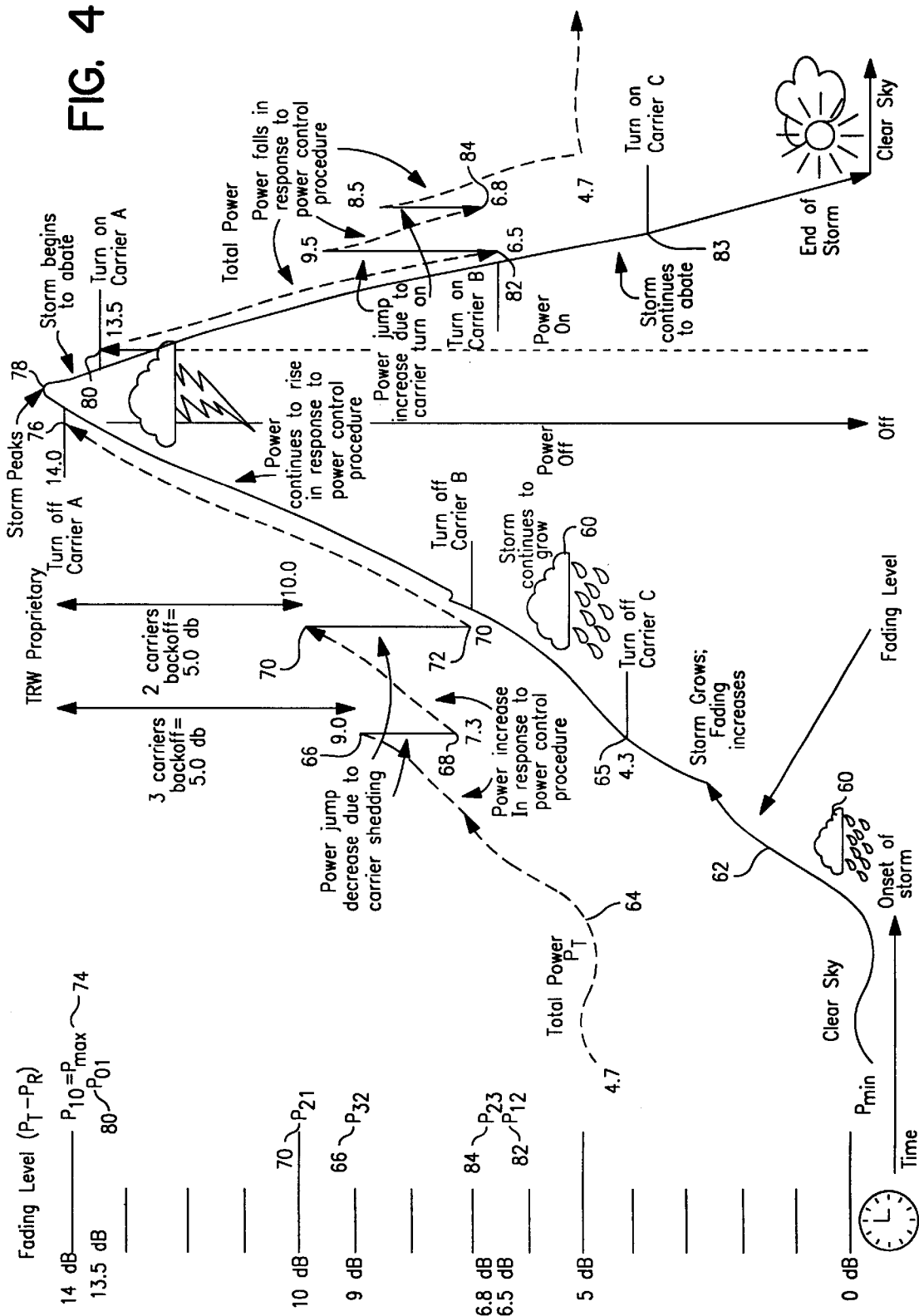
FIG. 4 is a detailed timing diagram illustrating the load shedding method of the present invention.

Turning now to FIG. 4, an example of a load shedding method to enhance uplink margin with combined FDMA/TDMA uplinks is shown. The horizontal axis represents time and the vertical axis is in decibels (dB) relative to clear sky conditions. Various power levels are also noted at the left that represent the thresholds at which carrier channels may be shed or restored depending on the current amount of attenuation or fading being experienced. The power levels shown are either the total transmit power $P_T$ or the attenuation or fading level (i.e., $P_T$–$P_R$).

In this example, the designed power levels provide for a 4.0 dB backoff when two carrier channels are active and a 5.0 dB backoff when all three carrier channels are active. It is further assumed that there is a 4.3 dB uplink margin under clear sky conditions with all three carrier channels active.

The total backoff from saturation of the high power amplifier in the up-converter portion 54, for a single carrier is thus 5.0+4.7+4.3 or 14.0 dB. It should be further understood that the user terminal 14 adjusts the transmit power level $P_T$ to try to maintain a constant received power level $P_R$ regardless of the location of the user terminal 14, its transmitting characteristics, and any rain or other attenuation that the user terminal 14 is experiencing. To try to maintain this constant received power level $P_R$, user terminal 14 adjusts its transmit power level $P_T$ for the RF uplink signal in small increments, typically 0.25 dB, via the terminal control unit 46 and the uplink baseband units 42, in response to the power control reports from the communications processing satellite 12.

At the far left of FIG. 4, a clear sky period is initially shown where the user terminal 14 has ample power margin to support all three carrier channels (i.e., carriers A, B and C), with each carrier channel separately being at its minimum level (0.0 dB) and collectively being 10 LOG [3]=4.7 dB total power. During this initial clear sky period, the transmit power $P_T$ is kept close to this level by employing the load shedding method discussed above. As a storm 60 begins, RF uplink attenuation experienced by the user terminal 14 increases as shown by solid line 62. This increased attenuation is compensated by incrementally increasing the transmit power level $P_T$ under the instruction of the terminal control unit 46, as shown by dashed line 64. The increase in total transmit power $P_T$ continues until the three channel uplink margin of 4.3 dB is exhausted, identified by reference numeral 65. At this time, the total transmit power $P_T$ from the RF transmit and receive unit 48 has risen to 9.0 dB, represented by power threshold $P_{32}$ and identified by reference numeral 66. This threshold 66 is 5.0 dB below saturation of the high power amplifier in the up-converter portion 54. With continued intensification of the storm 60, the user terminal 14 can no longer accommodate three carrier channels in a linear fashion and so, in response to the next power control report from the processing communication satellite 12, the user terminal 14 sheds load by terminating or turning off carrier channel C at threshold 66 (i.e. $P_{32}$). By doing this, the transmit power level $P_T$ drops by 10 LOG [⅔]=1.7 dB for a level of 7.3 dB, identified by reference numeral 68. By dropping carrier channel C, plus the 1 dB reduced backoff required with two carrier channels provides a 2.7 dB of new uplink margin against additional fading of the two remaining carrier channels A and B for a total of 10 dB at threshold $P_{21}$, identified by reference numeral 70.

As the storm 60 continues to become more severe, the attenuation continues to increase (line 62) and the terminal control unit 46 in the user terminal 14 continues to request incremental increases in the transmit power $P_T$, via the uplink baseband units 42 adjusting the IF uplink power levels. When the attenuation or fading level reaches 7.0 dB, identified by reference numeral 72, the transmit power $P_T$ at the high power amplifier in the up convertor portion 54 has risen to 10.0 dB, which is at the two carrier backoff of 4.0 dB below saturation. Further effective increases in the transmit power level cannot be sustained for both carrier channels, such that carrier channel B is turned off at this point, with the effect that the total power drops again, this time by 3.0 dB to a level of 7.0 dB, identified by reference numeral 72.

Should the storm 60 continue to grow, the user terminal 14 may transmit the single carrier channel A up to a level of 14 dB which is the saturization level of the high power amplifier in the up- converter portion 54. Above this level, the user terminal 14 can no longer respond to the terminal control unit's 46 request for further increases in transmit power $P_T$. This threshold level is $P_{10}=P_{max}$, identified by reference numeral 74. Since the user terminal 14 can no longer sustain RF uplink communications with the high reliability required by the processing communications satellite 12, the user terminal 14 terminates the last carrier channel A, identified by reference numeral 76.

During this standby condition, all uplink data transmissions from the user terminal 14 to the processing communications satellite 12 are ceased, except for periodic synchronization signals and power control reports. The synchronization signals are used to retain or regain synchronization between the user terminal 14 and the processing communications satellite 12 and the power control reports determine if the attenuation level has dropped to a level where communications can resume. In this example, the storm 60 eventually reaches its peak 78 and starts to diminish, as shown by line 62. When the attenuation level has fallen to 13.5 dB, identified by threshold $P_{01}$ and reference numeral 80, the user terminal 14 senses that it can resume transmission of carrier channel A, via power control reports from the processing communications satellite 12. By waiting until the storm drops to 0.5 dB below its saturation operation level of 14.0 dB, a hysteresis level is built into the system so that the communications uplink does not toggle off and on near a threshold level.

As the rain attenuation continues to decrease, the user terminal 14 also decreases its transmit power level $P_T$ as it follows the instructions from the terminal control unit 46. When the fading level had dropped to 6.5 dB, identified by reference numeral 82 (threshold $P_{12}$), the high power amplifier in the up-converter portion 54 has sufficient reserves to turn on the second carrier channel B. When carrier channel B is reactivated, total transmit power level $P_T$ jumps to 9.5 dB. As the storm further weakens to an attenuation level of 3.8 dB, identified by reference numeral 83, the transmit power level $P_T$ is also incrementally decreased to 6.8 dB, identified by threshold 84 ($P_{23}$). At threshold 84, carrier channel C is reactivated causing the total power again to rise to 8.5 dB, which is slightly more than the 5.0 dB linearization backoff for the three carrier operation. The transmit power level $P_T$ of the user terminal 14 then continues downward as the storm 60 ends and clear sky is again observed. With clear sky, rain attenuation is 0 dB and the transmit power level $P_T$ is 4.7 dB.

Note that in this example, all power levels have been specified in decibels. These values are all relative and referenced to a level that is 14.0 dB below the high power amplifiers saturation level. If the rated power of the high power amplifier is 25 watts (14 dBW), then all of these levels would be the same in dBW. Note also that the power levels at which the number of channels drop from N to N−1 and level at which they are restored from N−1 to N are separated by a small amount, 0.5 dB in this example. This separation provides the hysteresis so that the load shedding method does not alter states unnecessarily near threshold conditions.

Figure 5:
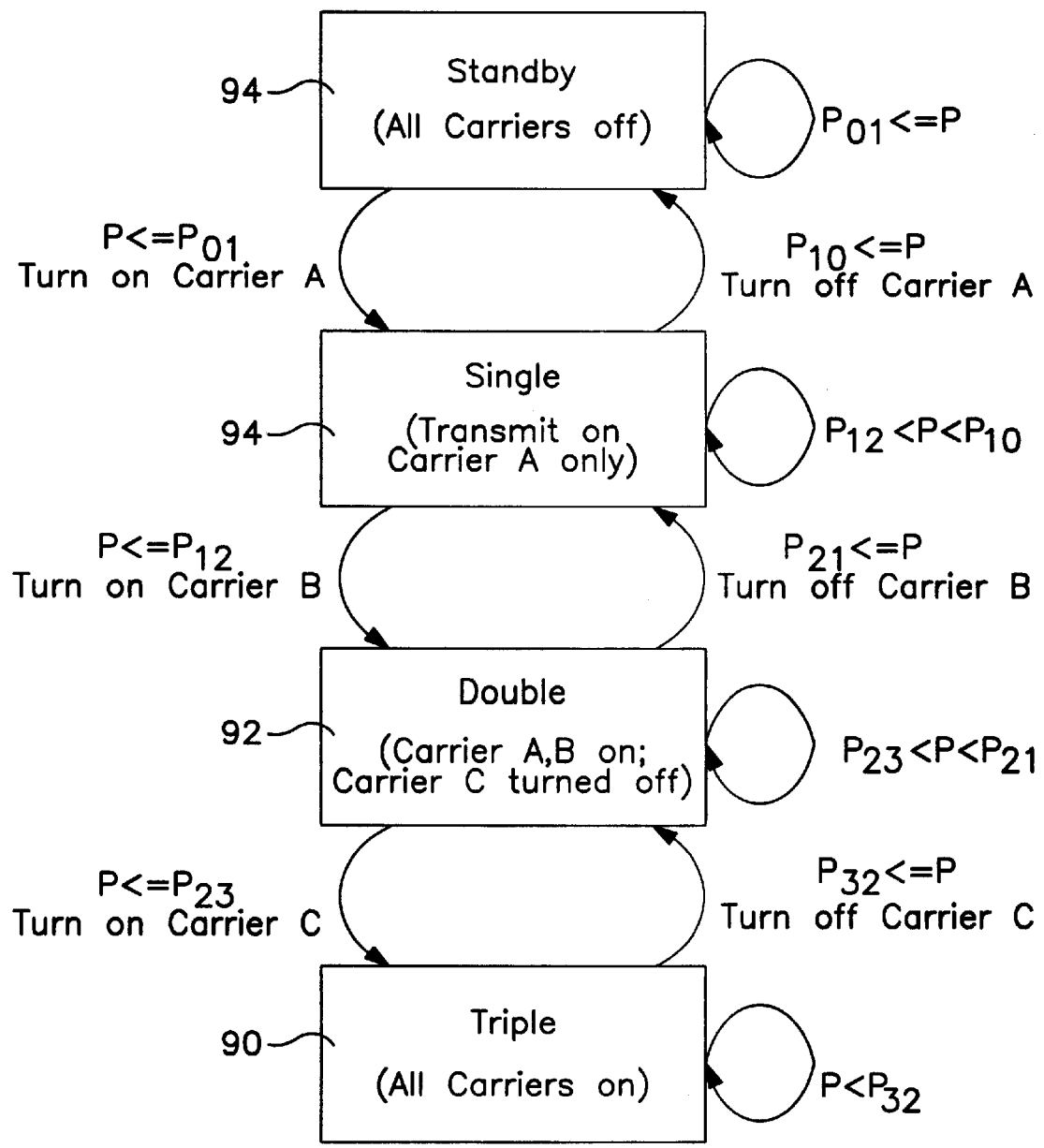
FIG. 5 is a detailed state and action diagram illustrating the actions performed by a terminal control unit in the terrestrial transmitter.

Turning now to FIG. 5, a state and action diagram illustrates the load shedding method or power control procedure performed by the terminal control unit 46. Referring to block 90, this block represents the state when all three carrier channels are on (i.e., A, B and C). In this state, as long as the transmit power $P_T$ is less than the power threshold $P_{32}$, identified by threshold 66 in FIG. 4 (9 dB), all three carrier channels will continue to be transmitted. Should the transmit power $P_T$ increase to a level that is equal to or greater than the threshold level $P_{32}$, carrier channel C is turned off and the method progresses to state block 92. At state block 92, should the transmit power level $P_T$ stay between power threshold $P_{21}$, identified by numeral 70 in FIG. 4 (10 dB), and power threshold $P_{23}$, identified by numeral 84 in FIG. 4 (6.8 dB), the user terminal 14 will continue to transmit two carrier channels. Should the power increase to a level that is equal to or greater than threshold $P_{21}$, carrier channel B is turned off and the method steps to state block 94.

Here again, should the transmit power level $P_T$ stay between threshold $P_{12}$ and threshold $P_{10}$, identified by reference numerals 82 and 74 in FIG. 4, respectively, the user terminal 14 will continue to transmit carrier channel A. Should the transmit power level $P_T$ be equal to or greater than threshold P1, then the action diagram progresses to state block 96 which is a standby condition and carrier channel A is also terminated. At this condition, only synchronization and power control reports are transmitted between user terminal 14 and processing communication satellite 12 in order to maintain synchronization and determine when the attenuation level is sufficiently low to begin data transmission again.

In this regard, when the attenuation level is less than or equal to threshold $P_{01}$, identified by reference number 80 in FIG. 4 (13.5 dB), carrier channel A is again turned on, thereby moving to state block 94. When the attenuation is less than or equal to threshold P12, identified by reference numeral 82 in FIG. 4 (6.5 dB), carrier channel B is turned on, thereby moving to state block 92. Finally, should the attenuation level be less than or equal to threshold $P_{23}$, identified by reference numeral 84 in FIG. 4 (6.8 dB), carrier channel C is turned on, thereby moving to state block 90 where all carrier channels are on.

Figure 6:
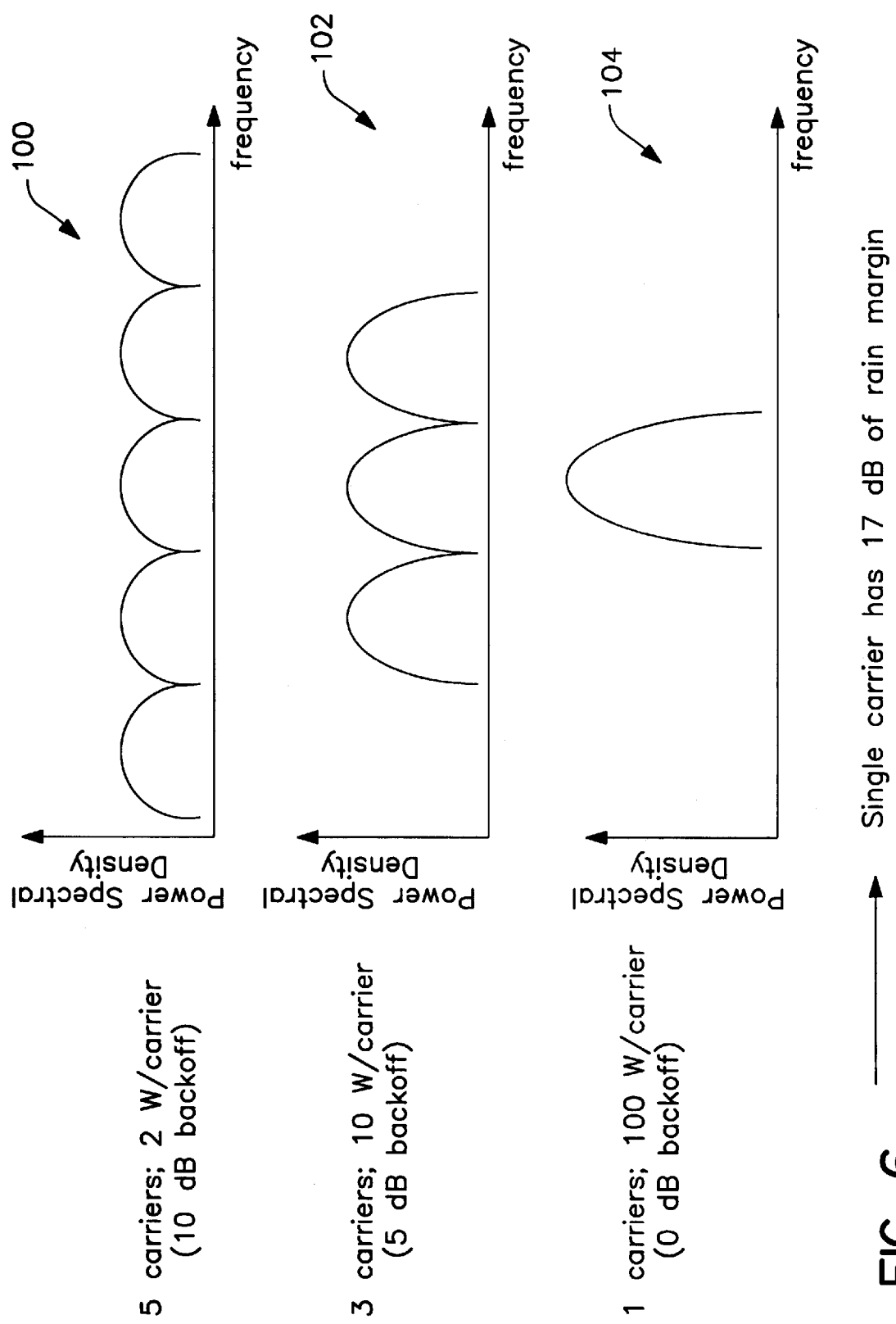
FIG. 6 is an example illustrating power levels versus number of carriers which are transmitted by the terrestrial terminal.

Referring now to FIG. 6, a further example is shown illustrating the power spectral density of multiple carrier channels produced by a single 100 watt amplifier. In this regard, graph 100 illustrates the power spectral density of five (5) carrier channels, with each carrier channel having two watts of transmit power $P_T$ per carrier channel (i.e. a total of 10 watts) and a 10 dB backoff from the high power amplifier's saturation level. In graph 102, the power spectral density of three carrier channels is shown after two carrier channels have been dropped or the transmission terminated. With three carrier channels, ten (10) watt per carrier transmit power $P_T$ is available (i.e. a total of 30 watts) with a 5 dB backoff from the saturation level of the high power amplifier. In graph 104, two additional carrier channels are dropped and only a single carrier channel exists. Since there is only a single carrier channel, the amplifier may be operated without backoff so that a transmit power $P_T$ of 100 watts is available with a 0 dB backoff on the high power amplifier. Accordingly, with a single carrier channel being transmitted, the high power amplifier in the up-converter portion 54 is able to operate at its most efficient level or a 0 dB backoff. It should be noted that upon review of the graphs 100–104, it can be readily observed that there is a significant increase in power per carrier channel as the number of carriers is reduced from a total of five carrier channels to a single carrier channel (i.e. two watts per carrier vs. 100 watts per carrier) which results because of both the reduced power required for the number of carrier channels dropped, as well as the increased power from being able to run the high power amplifier closer to its saturation level.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A load shedding method to enhance uplink margin between a terrestrial terminal and a satellite in a satellite based communications system, said load shedding method comprising:

generating at the terrestrial terminal a first signal having a first carrier channel;

generating at the terrestrial terminal a second signal having a second carrier channel;

transmitting from the terrestrial terminal to the satellite a cumulative uplink signal formed by the first signal having the first carrier channel and the second signal having the second carrier channel;

determining by a terminal control unit in the terrestrial terminal a transmit power level $P_T$ of the cumulative uplink signal formed by the first signal and the second signal transmitted from the terrestrial terminal;

determining a received power level $P_R$ of the cumulative uplink signal formed by the first signal and the second signal received at the satellite;

transmitting a power control report from the satellite to the terrestrial terminal that identifies the received power level $P_R$ of the cumulative uplink signal formed by the first signal and the second signal received at the satellite;

determining an attenuation level $P_T$–$P_R$ by the terminal control unit in the terrestrial terminal;

terminating transmission of the second signal having the second carrier channel upon instruction by the terminal control unit when the attenuation level $P_T$–$P_R$ of the cumulative uplink signal formed by the first signal and the second signal transmitted from the terrestrial terminal exceeds a first threshold; and resuming transmission of the second signal having the second carrier channel upon instruction by the terminal control unit when the attenuation level $P_T$–$P_R$ is less than a second threshold, wherein the first threshold is greater than the second threshold to provide a level of hysteresis.

2. The load shedding method as defined in claim 1 further comprising adjusting the transmit power level $P_T$ of the uplink signal formed by the first signal and the second signal transmitted from the terrestrial terminal based upon the received power level $P_R$ of the uplink signal formed by the first signal and the second signal received at the satellite.

3. The load shedding method as defined in claim 1 further comprising summing the first signal having the first carrier channel and the second signal having the second carrier channel and transmitting the summed uplink signal being a composite of the first signal having the first carrier channel and the second signal having the second carrier channel.

4. The load shedding method as defined in claim 1 wherein the first signal having the first carrier channel and the second signal having the second carrier channel is a combined frequency division multiple access (FDMA)/time division multiple access (TDMA) signal.

* * * * *